(12) United States Patent
Brown et al.

(10) Patent No.: US 12,282,574 B2
(45) Date of Patent: Apr. 22, 2025

(54) GENERATIONAL ACCESS TO SAFEGUARDED COPY SOURCE VOLUMES

(71) Applicant: International Business Machines Corporation, Armonk, NY (US)

(72) Inventors: Theresa Mary Brown, Tucson, AZ (US); Dale F Riedy, Poughkeepsie, NY (US); William J. Rooney, Hopewell Junction, NY (US); Scott B. Compton, Hyde Park, NY (US); Gregory Edward McBride, Vail, AZ (US); John R. Paveza, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 17/809,348

(22) Filed: Jun. 28, 2022

(65) Prior Publication Data

US 2023/0418960 A1    Dec. 28, 2023

(51) Int. Cl.
G06F 21/62    (2013.01)
G06F 21/60    (2013.01)

(52) U.S. Cl.
CPC ........ G06F 21/6218 (2013.01); G06F 21/604 (2013.01)

(58) Field of Classification Search
None
See application file for complete search history.

(56) References Cited

U.S. PATENT DOCUMENTS

| | | | |
|---|---|---|---|
| 7,360,113 B2 | 4/2008 | Anderson | |
| 7,668,880 B1 * | 2/2010 | Carroll | G06F 11/1464 707/999.204 |
| 7,818,608 B2 | 10/2010 | DeMaio | |
| 8,732,206 B2 | 5/2014 | Resch | |
| 8,903,779 B1 | 12/2014 | Holenstein | |
| 8,984,243 B1 | 3/2015 | Chen | |
| 9,395,926 B2 | 7/2016 | Nakagawa | |
| 9,588,847 B1 | 3/2017 | Natanzon | |
| 10,789,132 B2 | 9/2020 | McBride | |
| 2001/0052073 A1 | 12/2001 | Kern et al. | |
| 2004/0010732 A1 * | 1/2004 | Oka | G06F 11/1469 714/13 |

(Continued)

FOREIGN PATENT DOCUMENTS

| | | |
|---|---|---|
| CN | 1822004 A | 8/2006 |
| CN | 103842954 A | 6/2014 |

(Continued)

OTHER PUBLICATIONS

HP StorageWorks P9000 Raid Manager User Guide, HP Part No. T1610-96039 Published: Nov. 2011, Edition: Seventh, © 2010, 2011 Hewlett-Packard Development Company, L.P., 256 pages.

(Continued)

*Primary Examiner* — Sanchit K Sarker
(74) *Attorney, Agent, or Firm* — Tijon Poltavets

(57) ABSTRACT

Ensuring that enterprise data that has potentially become corrupted is recoverable and usable by creating safeguarded copy volumes of the enterprise data. One important aspect of any corruption detection scheme is to determine when the data has become corrupted and locate the last known uncorrupted copy of the data as quickly as possible. Once this set of data is identified, the restoration process can begin with that data, and subsequent logged transactions can be reapplied if possible, which brings the data to the most recent and uncorrupted version.

15 Claims, 7 Drawing Sheets

(56) References Cited

U.S. PATENT DOCUMENTS

| | | |
|---|---|---|
| 2005/0223170 A1 | 10/2005 | Ushijima |
| 2006/0190505 A1* | 8/2006 | DeMaio ............... G06F 11/1458 |
| | | 714/E11.122 |
| 2006/0236056 A1 | 10/2006 | Nagata |
| 2006/0259722 A1 | 11/2006 | Watanabe |
| 2012/0005657 A1 | 1/2012 | Huber et al. |
| 2016/0070490 A1 | 3/2016 | Koarashi |
| 2019/0250849 A1* | 8/2019 | Compton ............... G06F 3/0664 |
| 2019/0324924 A1 | 10/2019 | Miller et al. |
| 2020/0081629 A1 | 3/2020 | Brown |
| 2021/0208973 A1 | 7/2021 | Ngo |
| 2023/0409441 A1* | 12/2023 | Sharma ............... G06F 11/1451 |

FOREIGN PATENT DOCUMENTS

| | | |
|---|---|---|
| EP | 1717689 A1 | 11/2006 |
| EP | 2899634 A1 | 7/2015 |
| WO | 2020223112 A1 | 11/2020 |

OTHER PUBLICATIONS

"Preventing, Detecting, and Repairing Block Corruption: Oracle Database 11g", Oracle Maximum Availability Architecture White Paper, May 2012, 17 pages.

Mell et al., "The NIST Definition of Cloud Computing", NIST National Institute of Standards and Technology U.S. Department of Commerce, Special Publication 800-145, Sep. 2011, 7 pages.

"Notification of Transmittal of the International Search Report and the Written Opinion of the International Searching Authority, or the Declaration", From the International Searching Authority, Applicant's or agent's file reference: EIE230283PCT, International application No. PCT/CN2023/089039, Date of mailing: Jun. 26, 2023, International filing date: Apr. 18, 2023, 7 pgs.

Rooney et al., "Fine Granularity Read Access to Generational Safeguarded Copy Data", U.S. Appl. No. 17/809,362, filed Jun. 28, 2022, 31 pages.

IBM Appendix P, "List of patents and patent applications treated as related", Filed Jun. 28, 2022, 2 pages.

* cited by examiner

GENERATIONAL ACCESS TO SAFEGUARDED COPY SOURCE VOLUMES

BACKGROUND

The present invention relates generally to the field of data protection, and more particularly to methods of preserving and ensuring that enterprise data that is stored in the cloud is not corrupted.

SUMMARY

According to an aspect of the present invention, there is a method, computer program product and/or computer system that performs the following operations (not necessarily in the following order): (i) receiving a first volume of enterprise data, with the first volume of enterprise data including a plurality of files created at a first point in time; (ii) creating a safeguarded copy of the plurality of files created at the first point in time, with the safeguarded copy being set of backup copies of the plurality of files created at the first point in time; (iii) creating a generation identification (generation ID) for the set of backup copies of the plurality of files created at the first point in time; (iv) determining that a first portion of the plurality of files created at the first point in time needs to be accessed at a second point in time; (v) using the generation ID to identify a set of read-only data that is a generation copy of the first portion of the read-only data at the first point in time that is accessed at the second point in time; and (vi) accessing the generation copy of the first portion of the read-only data at the first point in time that is accessed at the second point in time without the need to restore the data to intermediate volume(s) (such as recovery volume(s)).

DETAILED DESCRIPTION

Figure 1:
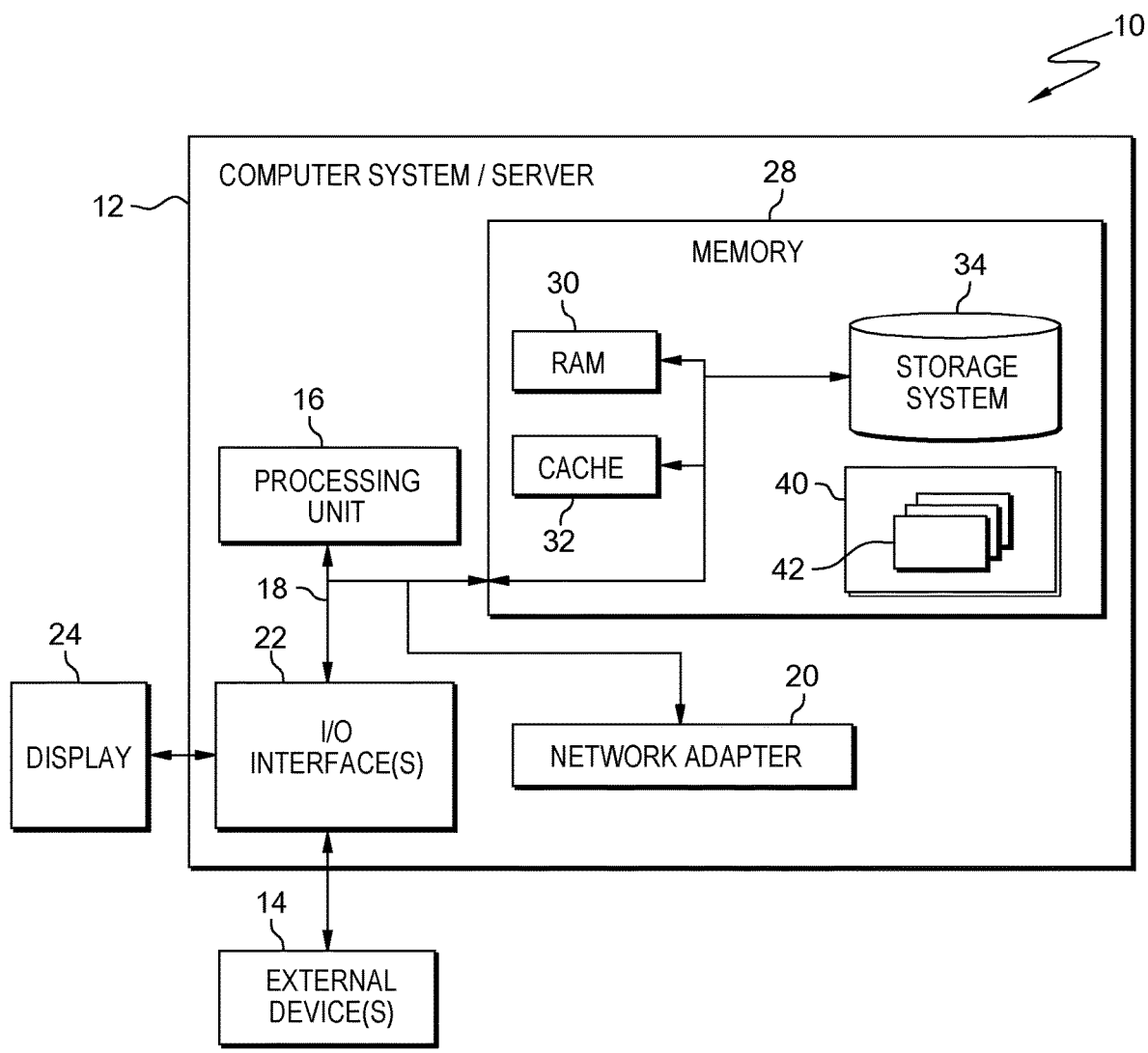
FIG. 1 depicts a cloud computing node used in a first embodiment of a system according to the present invention.

This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
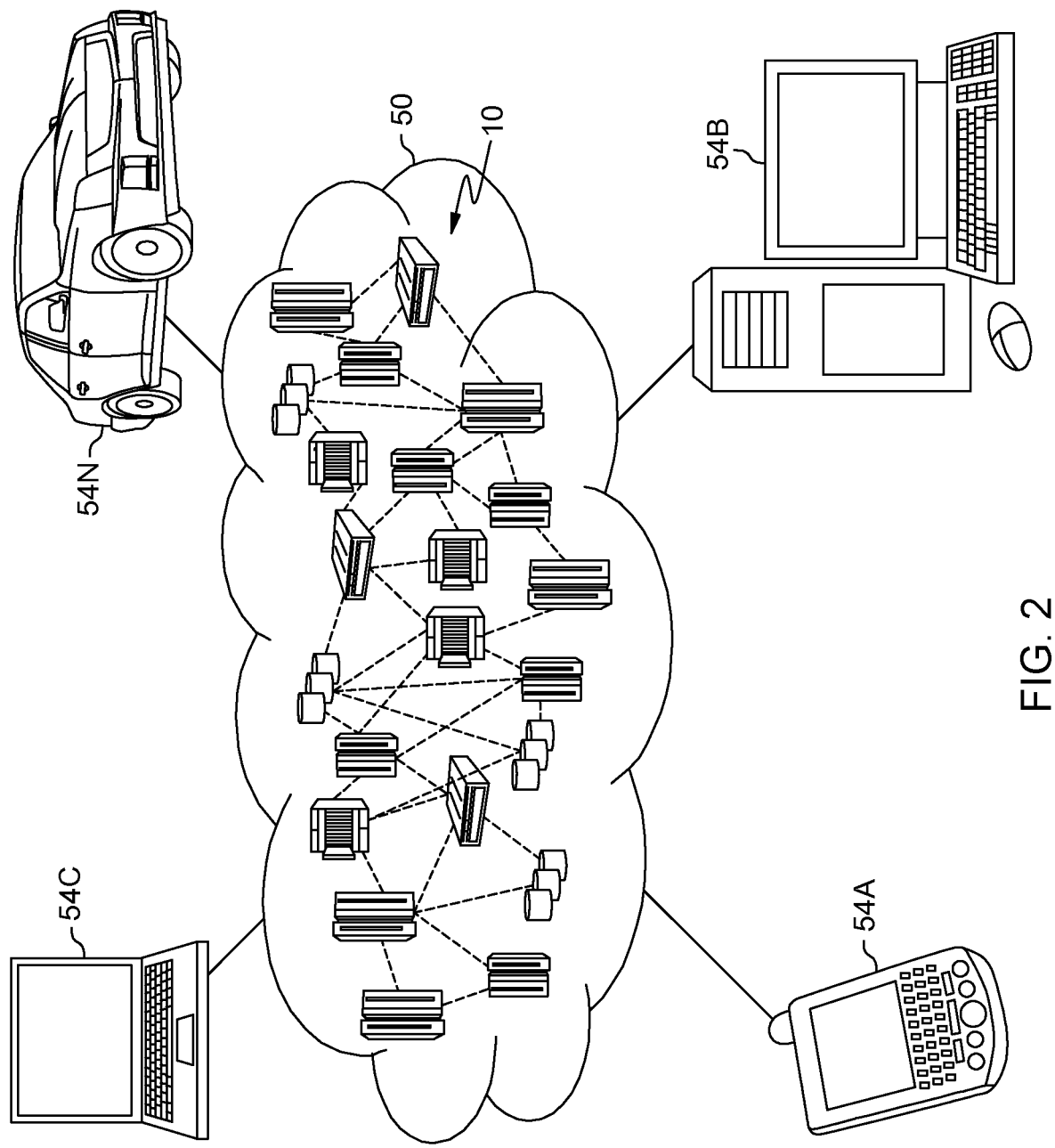
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
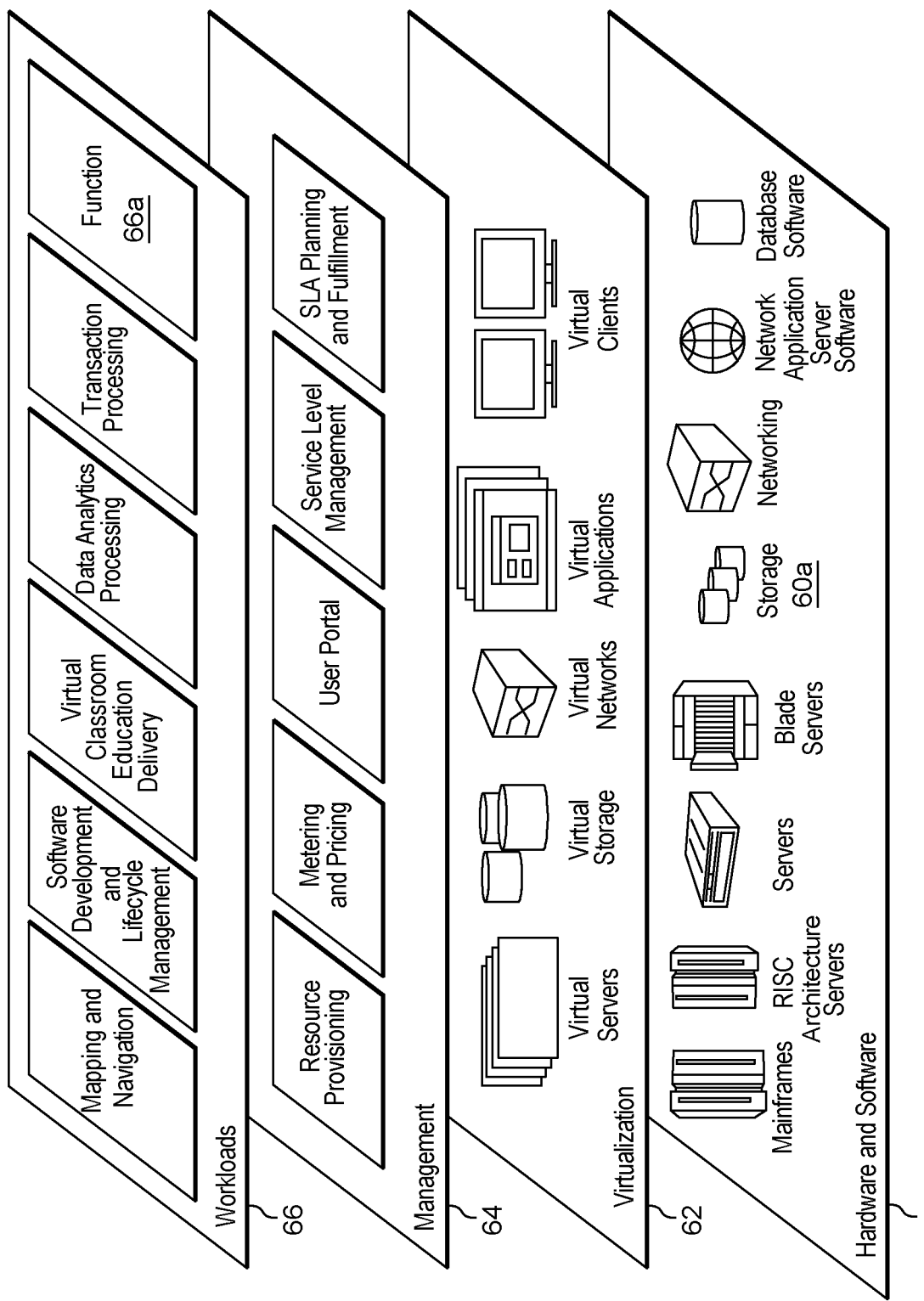
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes; RISC (Reduced Instruction Set Computer) architecture based servers; storage devices; networks and networking components. In some embodiments software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66a) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figures 4, 5:
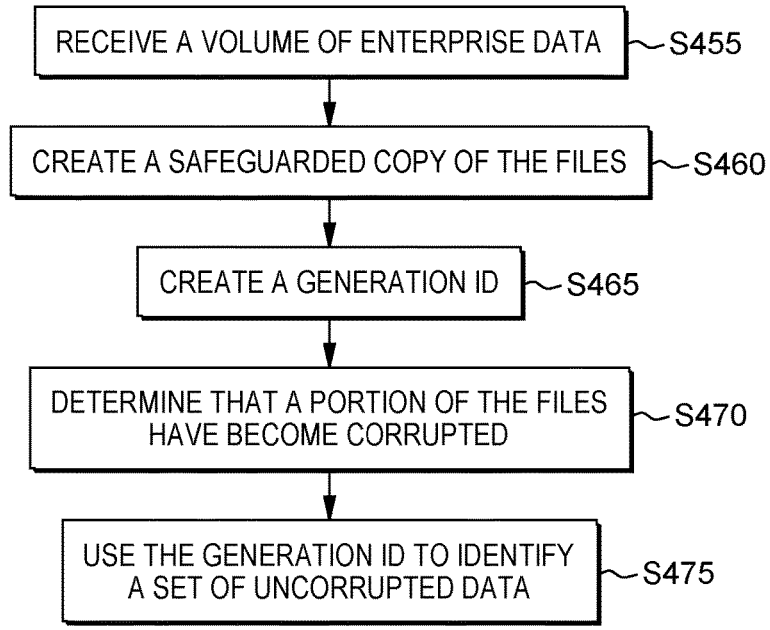
FIG. 4 is a flowchart showing a first embodiment method performed, at least in part, by the first embodiment system.
FIG. 5 is a block diagram showing a machine logic (for example, software) portion of the first embodiment system.

FIG. 4 shows flowchart 450 depicting a method according to the present invention. FIG. 5 shows program 300 for performing at least some of the method operations of flowchart 450. This method and associated software will now be discussed, over the course of the following paragraphs, with extensive reference to FIG. 4 (for the method operation blocks) and FIG. 5 (for the software blocks). One physical location where program 300 of FIG. 5 may be stored is in storage block 60a (see FIG. 3).

Processing begins at operation S455, where receive enterprise data module ("mod") 305 receives a first volume of enterprise data. In some embodiments, the first volume of enterprise data can include both encrypted data and non-encrypted data. Additionally, the multitude of files that are included in the first volume of enterprise data can be any type of file format that is able to be processed and saved as a safeguarded Copy (discussed in further detail in connection with operation S460, below).

Processing proceeds to operation S460, where create safeguarded copy mod 310 creates a safeguarded copy of the multitude of files that are included in the first volume of enterprise data. This safeguarded copy of the multitude of files are essentially uncorrupted read-only versions of each given file. Additionally, the safeguarded copy of the multitude of files are saved as a backup that can be referenced by the point in time at which these files were saved.

Processing proceeds to operation S465, where create generation ID mod 315 creates a generation ID for the safeguarded copy of the multitude of files (discussed in connection with operation S460, above). In some embodiments of the present invention, the generation ID is used to identify and locate the each unique file that is associated with its corresponding safeguarded copy. This way, when a portion of data (such as the portion of the first volume of enterprise data) becomes corrupted (as discussed in connection with operation S470, below), the replicate version(s) of the corrupted data can be quickly accessed due to the effective indexing of the safeguarded copy data.

Processing proceeds to operation S470, file corruption detection mod 320 determines that a first portion of the multitude of files in the first volume of enterprise data has become corrupted. In some embodiments, file corruption detection mod 320 uses corruption detection processing (CDP) (described in greater detail in connection with Sub-Section III, below) to track each given file of the multitude of files in order to accurately and reliably identify which files have become corrupted.

Processing finally proceeds to operation S475, where identify files mod 325 uses the generation ID to identify and locate the uncorrupted safeguarded copy version of the corrupted files (discussed in connection with operation S470, above). In some embodiments of the present invention, the uncorrupted safeguarded copy version of the corrupted file(s) are stored in a read-only format because: (i) these files can be easily accessed; and (ii) these files will not be subject to further alterations and/or potential corruption. Alternatively, identify files mod 325 uses the generation ID to identify and locate the uncorrupted safeguarded copy data. That is, the generation ID is used to identify a set of read-only data that is a generation copy of at least a portion of the read-only data that is: (i) received at the first point in time (discussed in connection with operation S455, above); and (ii) accessed at a second point in time.

III. FURTHER COMMENTS AND/OR EMBODIMENTS

Upon discovery, or suspicion, that data is missing or corrupted, either accidentally or maliciously, there is a need to identify the last known valid copy of the data. In some cases, the exact time at which the problem occurred it may be obvious, however in many cases the time at which the problem was introduced may not be known, whether accidental or malicious. In this case a process must be initiated to identify the last know valid (or uncorrupted) generation of data, which is referred to as "corruption detection processing" (CDP).

In some instances, corruption detection processing may be done by examining data from different safeguarded copy generations of data and searching for the last know generation of data that is known not to be corrupt. In some cases, this search may be very simple. For example, if it is known that the first instance of data corruption was that a location name such as "park" in the database was altered to another value, CDP may simply require that embodiments of the present invention locate, working backwards through the generations chronologically, the first generation where "park" is unaltered. In many cases, it will be far more complex and finding one example of incorrect data may not necessarily mean that the first instance of data corruption is found.

In some embodiments, CDP may be done by a person, automation (e.g., a software program), or a combination of both, where a person is using software tools to help identify data corruption. In any case, embodiments of the present invention do not necessarily describe a method to identify data corruption. Instead, it describes a method of allowing CDP to proceed more efficiently that is currently possible.

With respect to the current state of the art, in order to view each generation of data, a copy of this data would have to be created on a set of "recovery volumes". The recovery volumes would then contain the data at a recovery point (i.e., a generation) and could be accessed in order to examine that data at that point-in-time. Upon examining the data, if another generation needed to be examined, the recovery volumes would need to be recreated from the next generation. This process would then need to be repeated until the corruption detecting process was complete. The process of creating each set of recovery volumes is time consuming and may result in extended outages if the applications that rely on the data are unable to execute until valid data has been restored.

In many enterprise-related solutions, it is critical to protect a given product's critical and/or confidential data, and for the enterprise solution to reliably guard this confidential data. A reliable program for data protection is referred to herein as a "safeguarded copy." This safeguarded copy provides for the creation of many recovery copies (backups) of client data to ensure that recovery points for this client data are available, and that these recovery points are immutable versions of the data.

These recovery copies of the data are not directly accessible. The current art shows that in order to access the data contained in these safeguarded copy backups, the data must first be recovered to recovery volumes.

From the perspective of a proprietary system storage platform, the storage controller is providing the capability for host operating systems to qualify I/Os. Embodiments of the present invention provide a way for this to be done in the prefix command, or define extent, or even a more global way such as a DSO type command. This would allow a proprietary system storage platform (such as the DS8000) to deliver the appropriate data based on the requested generation ID as a response to the I/O. This is done using transitional cache in order to ensure that production performance impact is minimal or non-existent. ((Note: the term(s) "DS8000" and/or "DSO" may be subject to trademark rights in various jurisdictions throughout the world and are used here only in reference to the products or services properly denominated by the marks to the extent that such trademark rights may exist.)

In some embodiments, from the host operating system's perspective, a global system parameter allows the system programmer to qualify all I/Os using a specific generation ID.

One important aspect of any corruption detection scheme is to recognize as early as possible when the data has become corrupt and locate the last known uncorrupted copy of the data. Once this set of data is identified, the restoration process can begin with that data, and subsequent logged transactions can be reapplied if possible, which brings the data to the most recent and uncorrupted version.

Some embodiments of the present invention provide the ability to access safeguarded copy data without creating recovery volumes. In some embodiments, this is done in such a way that preserves as much of the production level performance when accessing the current generation of data (typically, by the production systems).

In some embodiments, data corruption detection must start with safeguarded copy recovery volumes. This would typically be done on a system other than the production system that is accessing and updating the data. As a recovery point is created, recovery volumes are generated and corruption detection processing (CDP) would occur on the CDP system. The result of the CDP is determining the state of the data. In some embodiments, CDP logic is used to implement the CDP process.

Generally speaking, application owners understand the structure of the data that is being generated and utilized, and would need to supply CDP logic that is capable of inspecting this data in order to determine the validity of the data. This could be exhaustive or utilize a sampling approach. In some embodiments, programs, scripts, or other software and/or processing techniques that are necessary to access and validate data are used.

Embodiments of the present invention provides a unique way of read-only access of these safeguarded copy backups without the need to create recovery volumes of the safeguarded copy backups. This reduces the complexity and expense of processing that is required to create the data that must be validated using the CDP. Additionally, this provides faster access to the safeguarded copy backups, thereby ensuring that the CDP can be completed as quickly as possible.

Each safeguarded copy backup set (a point-in-time consistent view of the data) resides in the safeguarded copy backup capacity. It is not organized as a set of volumes, and as previously mentioned, is not directly accessible on the production system or on the CDP system.

In some embodiments, the CDP system will use the same "production", or safeguarded copy source volumes to access data to be validated as the production system.

In some embodiments, a generation to be processed with CDP logic is identified. This can be done using a token, timestamp, generation number or sequence number (referred to herein as a "generation ID"). Some embodiments utilize a sequence number that is known by the management system, such as either the Copy Services Manager (CSM) or the Geographically Dispersed Parallel Sysplex (GDPS). This will be created when the safeguarded copy backup set is generated. The generation ID to be used is set as a system parameter for the CDP system.

For a proprietary OS instance, the system parameter could be set as a parameter in a "LOADxx" value, a "SYS1.PARMLIB" member, or using a system command. From this point on, all inputs/outputs to the safeguarded copy source volumes are done using the generation ID. Write operations are inhibited when a generation ID is used.

In some embodiments, CDP logic is executed. Data is read. The operating system applies the generation ID automatically. As described above, the logic would be required whether embodiments of the present invention are used to access the data, or whether the existing approach of creating recovery volumes and IPLing the system is used.

Some embodiments of the present invention use the generation ID to locate the records and/or tracks associated with the point-in-time copy of the data. The data may reside in cache or media associated with the actual safeguarded copy volume if unchanged, or, if changed, may reside in one of the appropriate generations in the safeguarded copy backup capacity.

By providing a generation or timestamp, embodiments of the present invention will use a combination of bitmaps to determine where to store that generation of data. The data may reside on the safeguarded capacity volume under one of the backups taken or the data may reside on the disk of the source volume.

In some embodiments, the operating system may utilize the input/output prefix command to pass the generation ID to embodiments of the present invention. Alternatively, some embodiments could do this in the define extent or wherever appropriate and potentially create a new "set domain command."

In some embodiments, the operating system will only apply the generation ID to inputs/outputs that contain read commands. Additionally, some embodiments will ignore a generation ID if the read command is issued to a target volume that is not a safeguarded copy source volume. Additionally, some embodiments will reject (that is, fail or ignore) a generation ID if the read command is issued to a target volume that is not a safeguarded copy source volume.

Some embodiments of the present invention will ensure that the "current" cache is not destroyed by generational data access. Generational data access may utilize "transitional" cache instead and immediately be demoted after reference. Some embodiments contain metadata for cache control block structures. The metadata for the cache can contain information regarding the "generation" of the data. The metadata will be able to distinguish between current and previous generation of data. When access to the non-current version is no longer necessary, that metadata will indicate that this version can be eligible to be demoted and/or discarded.

In some embodiments, the CDP logic validates that the data is not corrupt. Additionally, in some embodiments, once the CDP logic is complete on a generation, it may be necessary to shut down application systems (such as databases, applications) that may have cached data in memory.

Additionally, the next generation ID is determined and set in the system, and processing continues until either all generations have been processed or the most recent generation that is not corrupted is determined (as described above).

Figure 6:
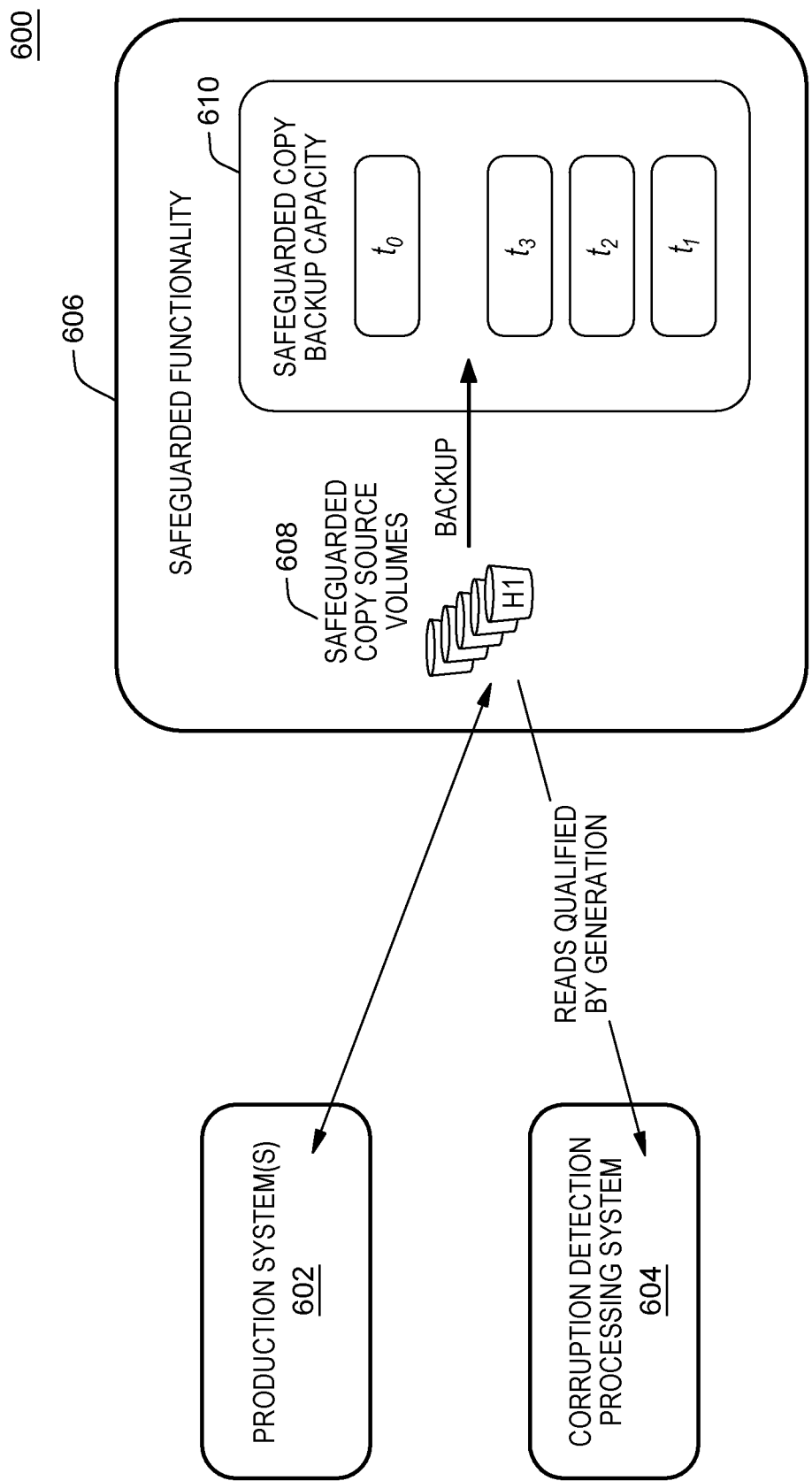
FIG. 6 is a block diagram showing information that is helpful in understanding embodiments of the present invention.

Block diagram 600 of FIG. 6 shows an example of using safeguarded copies according to embodiments of the present invention. Block diagram 600 includes: production system(s) 602, corruption detection processing system 604, safeguard functionality 606, safeguard copy source volumes 608, and safeguard copy backup capacity 610.

Some embodiments of the present invention include a method for generational access to safeguarded copy source volumes by a disk storage system. This method includes the following operations (and not necessarily in the following order): (i) accessing, by the disk storage system, a generation of the safeguarded copy source volumes based on a generation ID stored in an I/O request issued by a corruption detection processing (CDP) program or tool, wherein writes are inhibited in response to using the generation ID to access the generation of the safeguarded copy source volumes; and (ii) performing corruption detection processing on the generation of the safeguarded copy source volumes. In some embodiments, performing the corruption detection processing further includes locating, by the disk storage system and based on the generation ID, the records and/or tracks associated with the safeguarded copy source volumes. Additionally, the generation ID includes one selected from a group that includes at least the following: a token, a timestamp, a generation number, a sequence number and/or any other unique identifier of the generation ID.

Figure 7A:
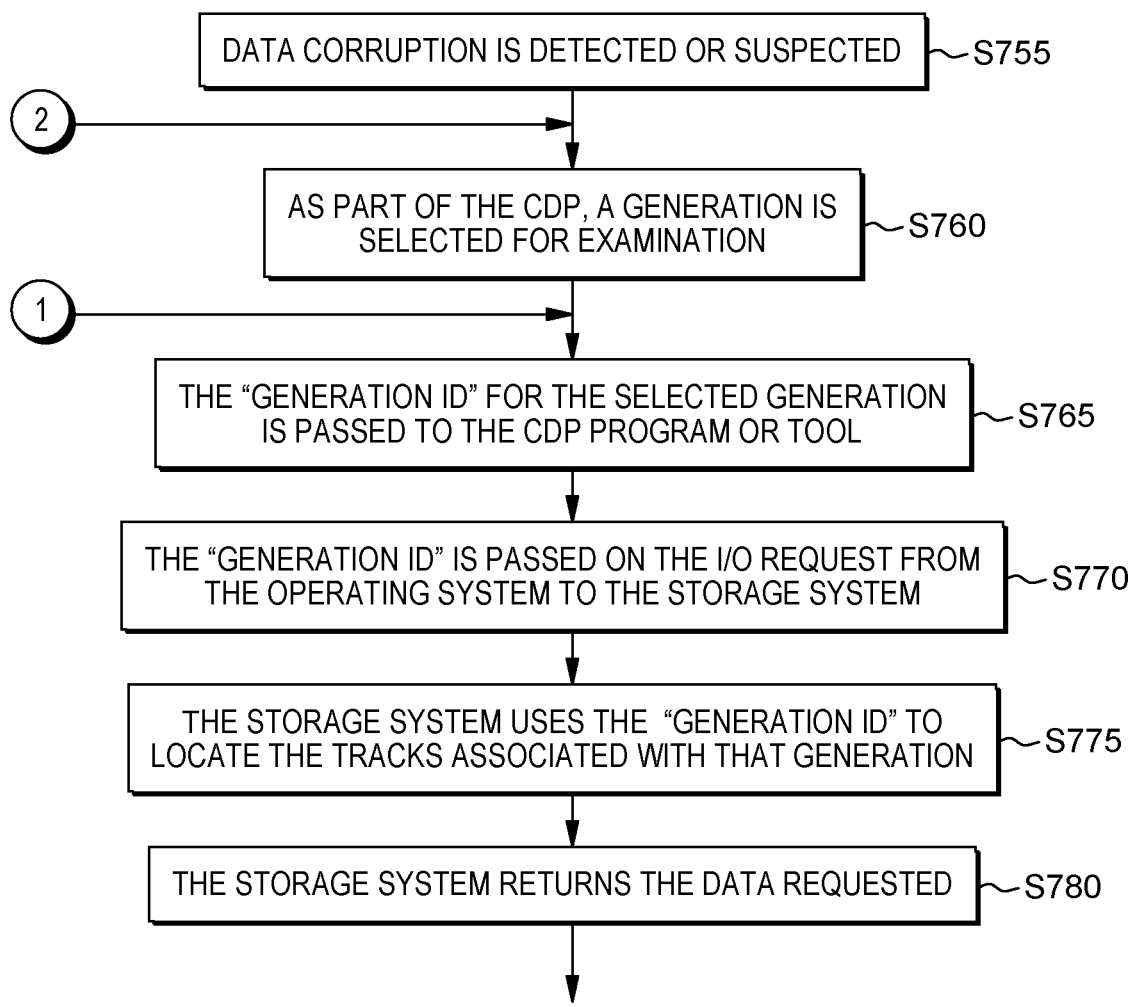
FIG. 7A is a flowchart showing a second embodiment method performed, at least in part, by the first embodiment system.
Figure 7B:
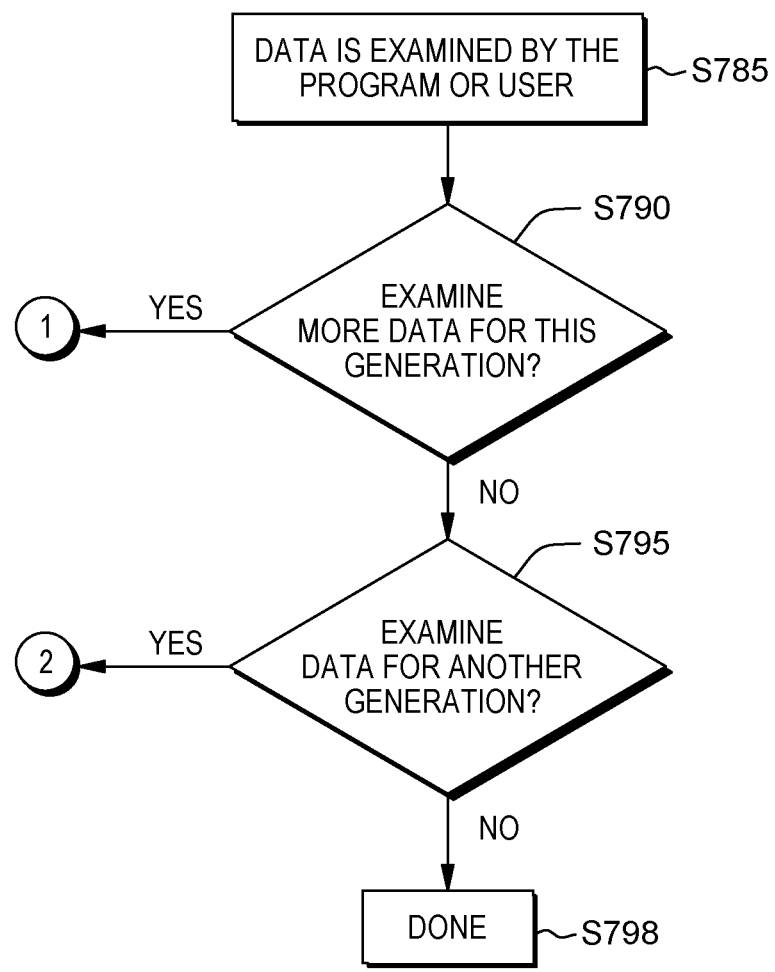
FIG. 7B is a flowchart showing a second embodiment method performed, at least in part, by the first embodiment system.

FIGS. 7A and 7B respectively show flowchart 750a and flowchart 750b, which, in combination, depict a method according to the present invention. This method is discussed in the following paragraphs with respect to flowcharts 750a and 750b.

Processing begins at operation S755 where upon discovery, or suspicion, that data is missing or corrupted, the user accesses the data for a generation through a program. Processing proceeds to operation S760 where the user or the CDP selects a generation of data to be examined.

Processing proceeds to operation S765 where the generation ID representing the generation to be examined is passed to the CDP program (or tool).

Processing proceeds to operation S770 where the generation ID is passed on the I/O request from the operating system to the storage system (such as the DS8000). The operating system may utilize the I/O prefix command to pass the generation ID to the storage system, the define extent command, and/or possibly a new "set domain command."

Processing proceeds to operation S775 where the storage system uses the generation ID to locate the data (such as records, tracks) associated with that specific generation of data. In some embodiments, the data may reside in cache or media associated with the actual safeguarded copy volume if unchanged, or if changed, may reside in one of the appropriate generations in the safeguarded copy backup capacity.

Processing proceeds to operation S780 where the storage system returns the requested data. Processing proceeds to operation S785 where the requested data is examined by the program or user in an effort to determine where the data corruption was introduced and to locate the last valid (or uncorrupted) copy of the data.

If additional data (such as the records, tracks, etc.) must be examined in order to determine where the data corruption was introduced (operation S790), embodiments of the present invention proceed back to S765 to get the next record requested (and not necessarily the next sequential record).

Otherwise processing proceeds to S795 where if another generation of data must be examined in order to determine where the data corruption was introduced, embodiments of the present invention proceed back to S760.

Otherwise processing proceeds to S798, where embodiments of the present invention locate the last valid generation.

Upon determining the last valid generation, data is restored as appropriate, which might include restoring data to the last valid generation and then reapplying logged transactions, if possible, to bring the data to the most current, uncorrupted version.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
   receiving a first volume of enterprise data, with the first volume of enterprise data including a plurality of files created at a first point in time;
   creating a safeguarded copy of the plurality of files created at the first point in time, with the safeguarded copy being a set of backup copies of the plurality of files created at the first point in time;
   creating a generation ID for the set of backup copies of the plurality of files created at the first point in time;
   determining that a first portion of the set of backup copies of the plurality of files created at the first point in time is to be accessed at a second point in time after the first point in time;
   identifying, utilizing the generation ID, a set of read-only data that is a generation copy of a first portion of read-only data at the first point in time that is accessed at the second point in time, wherein the generation copy of the first portion of read-only data is a safeguarded copy backup from the set of backup copies of the plurality of files at the first point in time, and wherein the safeguarded copy backup is an uncorrupted copy of the first portion of read-only data at the first point in time; and
   passing, by an input/output (I/O) prefix command, the generation ID to a storage controller, wherein a host operating system can qualify a set of I/O commands to obtain the set of read-only data that is the generation copy utilizing the generation ID for the safeguarded copy backup.

2. The method of claim 1, further comprising:
determining that the safeguarded copy of the plurality of files is unchanged; and
storing the set of read-only data that is the generation copy of the first portion of the read-only data at the first point in time that is accessed at the second point in time in transitional cache.

3. The method of claim 1, further comprising:
determining that the safeguarded copy of the plurality of files is unchanged; and
storing the first volume of enterprise data in media associated with the safeguarded copy.

4. The method of claim 1, wherein the host operating system applies the generation ID only to input/output (I/O) requests that include read commands.

5. The method of claim 1, wherein the host operating system fails a read command if the generation ID is issued to a target volume that is not associated with a safeguarded copy source volume.

6. A computer program product comprising:
a machine readable storage device;
computer code stored on the machine readable storage device, with the computer code including instructions and data for causing a processor set to perform operations including:
receiving a first volume of enterprise data, with the first volume of enterprise data including a plurality of files created at a first point in time;
creating a safeguarded copy of the plurality of files created at the first point in time, with the safeguarded copy being a set of backup copies of the plurality of files created at the first point in time;
creating a generation ID for the set of backup copies of the plurality of files created at the first point in time;
determining that a first portion of the set of backup copies of the plurality of files created at the first point in time is to be accessed at a second point in time after the first point in time;
identifying, utilizing the generation ID, a set of read-only data that is a generation copy of a first portion of read-only data at the first point in time that is accessed at the second point in time, wherein the generation copy of the first portion of read-only data is a safeguarded copy backup from the set of backup copies of the plurality of files at the first point in time, and wherein the safeguarded copy backup is an uncorrupted copy of the first portion of read-only data at the first point in time; and
passing, by an input/output (I/O) prefix command, the generation ID to a storage controller, wherein a host operating system can qualify a set of I/O commands to obtain the set of read-only data that is the generation copy utilizing the generation ID for the safeguarded copy backup.

7. The computer program product of claim 6, further comprising:
determining that the safeguarded copy of the plurality of files is unchanged; and
storing the set of read-only data that is the generation copy of the first portion of the read-only data at the first point in time that is accessed at the second point in time in transitional cache.

8. The computer program product of claim 6, further comprising:
determining that the safeguarded copy of the plurality of files is unchanged; and
storing the first volume of enterprise data in media associated with the safeguarded copy.

9. The computer program product of claim 6, wherein the host operating system applies the generation ID only to input/output (I/O) requests that include read commands.

10. The computer program product of claim 6, wherein the host operating system fails a read command if the generation ID is issued to a target volume that is not associated with a safeguarded copy source volume.

11. A computer system comprising:
a processor set;
a machine readable storage device;
computer code stored on the machine readable storage device, with the computer code including instructions and data for causing the processor set to perform operations including:
receiving a first volume of enterprise data, with the first volume of enterprise data including a plurality of files created at a first point in time;
creating a safeguarded copy of the plurality of files created at the first point in time, with the safeguarded copy being a set of backup copies of the plurality of files created at the first point in time;
creating a generation ID for the set of backup copies of the plurality of files created at the first point in time;
determining that a first portion of the set of backup copies of the plurality of files created at the first point in time is to be accessed at a second point in time after the first point in time;
identifying, utilizing the generation ID, a set of read-only data that is a generation copy of a first portion of read-only data at the first point in time that is accessed at the second point in time, wherein the generation copy of the first portion of read-only data is a safeguarded copy backup from the set of backup copies of the plurality of files at the first point in time, and wherein the safeguarded copy backup is an uncorrupted copy of the first portion of read-only data at the first point in time; and
passing, by an input/output (I/O) prefix command, the generation ID to a storage controller, wherein a host operating system can qualify a set of I/O commands to obtain the set of read-only data that is the generation copy utilizing the generation ID for the safeguarded copy backup.

12. The computer system of claim 11, further comprising:
determining that the safeguarded copy of the plurality of files is unchanged; and
storing the set of read-only data that is the generation copy of the first portion of the read-only data at the first point in time that is accessed at the second point in time in transitional cache.

13. The computer system of claim 11, further comprising:
determining that the safeguarded copy of the plurality of files is unchanged; and
storing the first volume of enterprise data in media associated with the safeguarded copy.

14. The computer system of claim 11, wherein the host operating system applies the generation ID only to input/output (I/O) requests that include read commands.

15. The computer system of claim 11, wherein the host operating system fails a read command if the generation ID is issued to a target volume that is not associated with a safeguarded copy source volume.

* * * * *